Dec. 29, 1936.  C. A. COMPTON  2,065,658
OIL FILTER
Filed Sept. 17, 1934   2 Sheets-Sheet 2

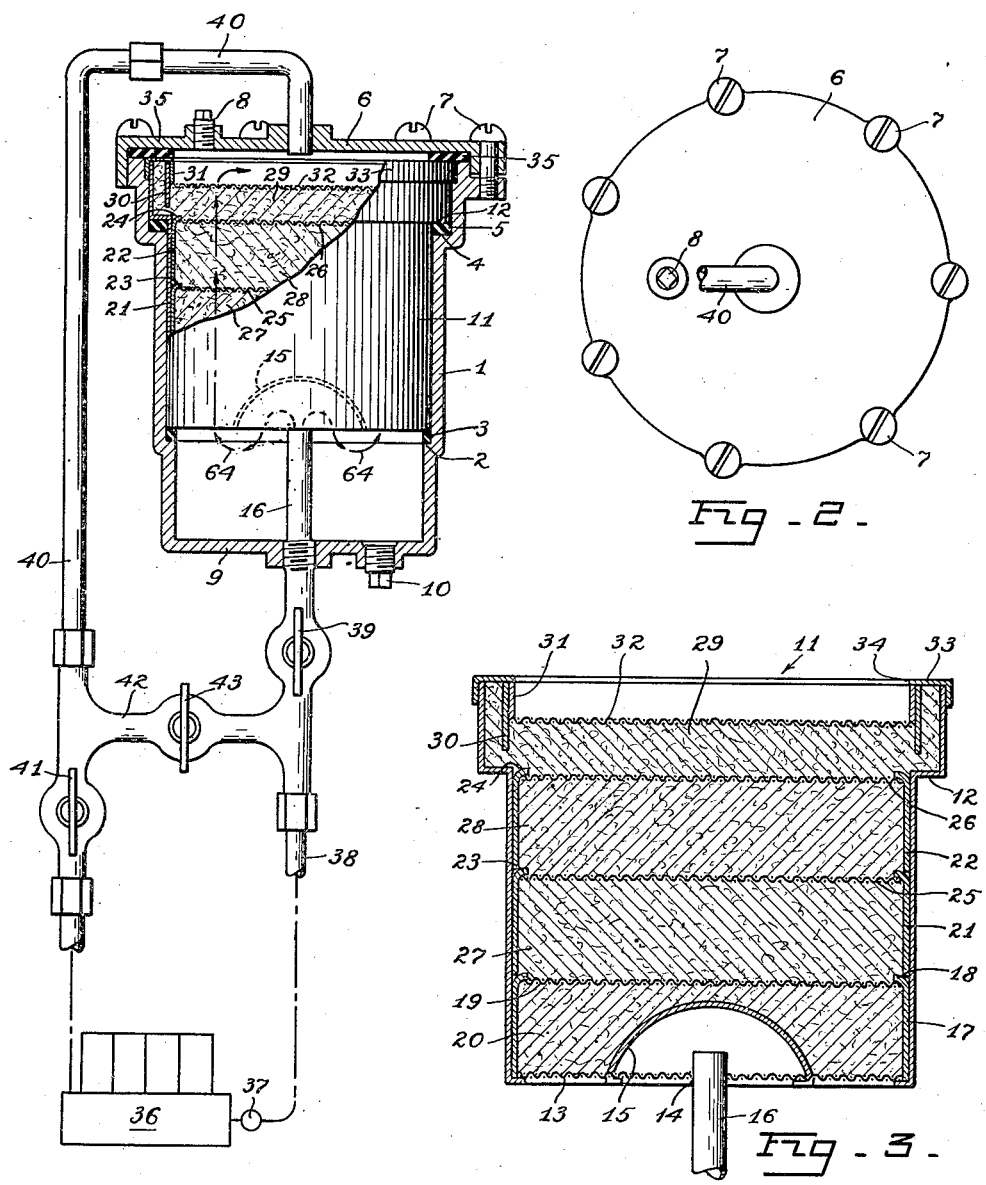

INVENTOR.
CHARLES A. COMPTON
BY Munn, Anderson & Liddy
ATTORNEYS.

Patented Dec. 29, 1936

2,065,658

UNITED STATES PATENT OFFICE 2,065,658

OIL FILTER

Charles A. Compton, Menlo Park, Calif.

Application September 17, 1934, Serial No. 744,433

5 Claims. (Cl. 210—140)

My invention relates to improvements in oil filters, and it consists of the combinations, constructions and arrangements hereinafter described and claimed.

An object of my invention is to provide an oil filter which is an improvement over the filter shown in my Patent No. 1,927,229 issued September 19, 1932. In the patent I showed an oil filter in which the wall of the casing was inclined inwardly for directing oil flowing along the wall of the casing toward the filtering medium.

In the present invention I provide deflecting members for directing the flow of oil inwardly toward the filtering medium, and this does away with the necessity of bending a portion of the casing inwardly.

A further object of my invention is to provide a device of the type described in which the oil is fed into the bottom of the casing, and then is caused to flow downwardly toward the bottom of the casing, and then upwardly toward the outlet end which is disposed at the top of the casing. The oil in flowing upwardly toward the outlet passes through a number of filtering means, and is directed upwardly and toward the center of the casing so that all of the oil must pass through the filtering means.

The filtering means can be provided in a cartridge which may be removably disposed in the casing, and this permits the filtering means to be renewed from time to time by merely substituting a new cartridge for the old one. For a less expensive filter, the filtering means can be placed directly in the casing, without the removable cartridge.

Novel means is provided for cleaning the filtering means while the latter still remains in the casing.

Other objects and advantages will appear in the following specification, and the novel features of the device will be particularly pointed out in the appended claims.

My invention is illustrated in the accompanying drawings forming a part of this application, in which Figure 1 is a section through the filter and shows the filter operatively connected to an internal combustion engine;

Figure 2 is a top plan view of Figure 1;

Figure 3 is a section through the removable cartridge;

Figure 4:
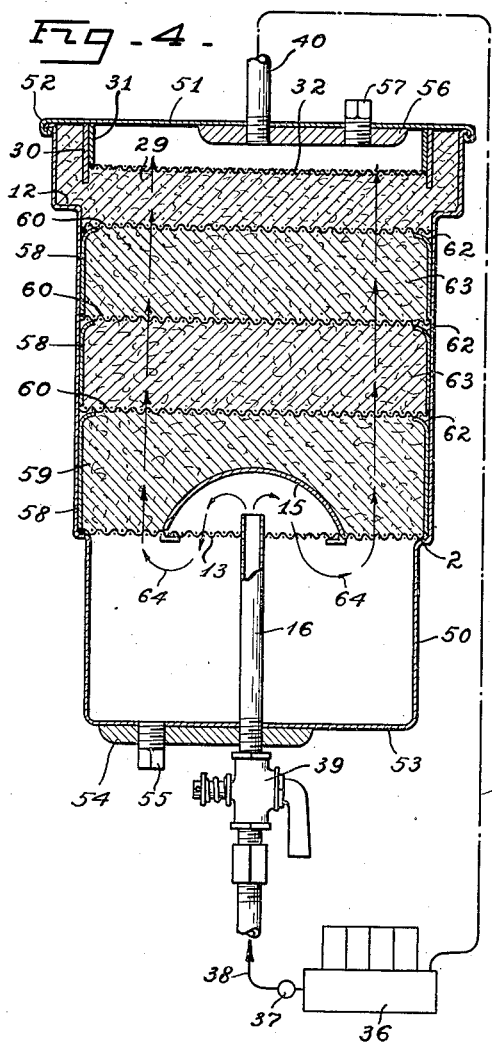
Figure 4 is a section through a modified form of the device.
Figure 5:
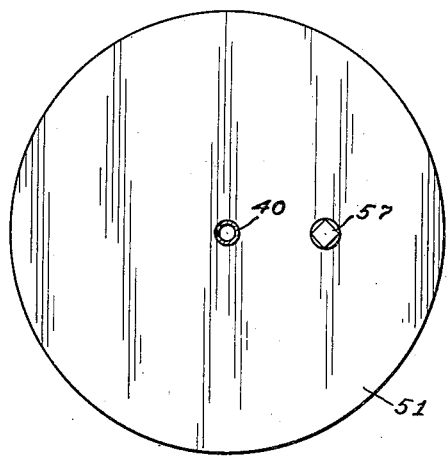
Figure 5 is a top plan view of Figure 4.

In Figures 1 to 3 inclusive, I show a casing 5 which is made from a casting, and I further show a removable cartridge disposed in the casing, and this cartridge carries the filtering means. In Figures 4 to 7 inclusive I show a more inexpensive filter in which the filtering means is placed directly in the casing and the removable cartridge is dispensed with. The casing in the form shown in Figure 4 is preferably stamped from sheet metal.

Referring to the form shown in Figures 1 to 3 inclusive, I provide a casing 1 which is preferably a casting, and this casing has a shoulder 2 for supporting a gasket 3, and has a shoulder 4 for supporting a second gasket 5. A cover 6 is secured to the casing by screws 7 or other suitable fastening means, and the cover carries a plug 8, see Figure 1, which may be removed for purposes of cleaning the interior of the casing. The bottom 9 of the casing is provided with a plug 10 which may also be removed for cleaning purposes.

Within the casing I removably dispose a cartridge indicated generally at 11, in Figure 3. This cartridge has a shoulder 12 that rests on the gasket 5. The bottom of the cartridge is closed by a screen 13, and this screen has an opening 14 in its center. A deflector 15 is secured to the screen 13 and directs oil flowing from an inlet pipe 16 downwardly toward the bottom 9 of the casing. The opening 14 receives the top of the oil inlet pipe 16.

Again referring to the cartridge in Figure 3 it will be seen that I provide an oil deflecting ring 17, this ring contacting with the wall of the cartridge, and having its upper edge curved inwardly at 18 for directing oil toward the center of the cartridge. A screen 19 is placed beneath the inwardly curved edge 18, and rests on a filtering medium 20 disposed between the screens 13 and 19.

In like manner oil deflecting rings 21 and 22 are disposed one above the other, and have inwardly curved upper edges 23 and 24, and these edges enclose screens 25 and 26, and the screens rest upon a filtering medium 27 and 28.

A large filtering pad 29 is mounted on top of the screen 26, and the pad rests upon the shoulder 12, and its marginal edge contacts with the cartridge wall. A ring 30 is placed on the pad and forces the pad edge against the shoulder 12 and against the casing wall that is disposed above the shoulder. This prevents oil from passing around the edge of the pad. All of the oil leaving the filter must pass through the pad 29. The ring 30 provides a space for receiving a second ring 31 that has a screened bottom 32. A cover 33 has an opening 34 substantially of the same diameter as the screen 32. The cartridge is removably disposed in the casing 1 and takes the position shown in Figure 1. As already stated the shoulder 12 rests on the gasket 4. The cover 33 bears against the gasket 35, and when the casing cover 6 is fastened in position the two gaskets 4 and 35 and the gasket 3 will seal the cartridge so that oil cannot pass between the casing wall and the cartridge wall.

Figure 1 also shows one way of connecting the filter with an internal combustion engine, indicated generally at 36. An oil pump shown diagrammatically at 37 pumps oil from the engine 36 into a pipe 38, that communicates with the pipe 16. A shut-off valve 39 is placed in the pipe 38. A return pipe 40 leads from the top of the casing 1 and is connected to the cover 6. This pipe 40 conveys the filtered oil back to the engine. A valve 41 is placed in the pipe 40. I further show a by-pass 42 connecting the pipes 38 and 40 together, and a shut-off valve 43 is placed in the pipe.

From the foregoing description of the various parts of the device, the operation thereof may be readily understood.

When the engine operates, oil will flow out from the pipe 16 and will be deflected downwardly by the deflector 15. The oil will then change its course and will flow upwardly and around the outside of the deflector 15 and up through the filtering materials and finally out through the outlet 40. The arrows in Figures 1 and 4 show the flow of oil. The change of oil flow from a downward to an upward direction causes the foreign particles to settle to the bottom 9 and to remain there until the filter is washed. The oil, in moving upwardly through the casing, enters the cartridge through the screen 13 and passes through the various filtering layers. The oil is prevented from flowing along the wall of the cartridge because of the oil deflecting edges on the rings. The oil is thoroughly cleaned as it passes through the filtering means, and is returned through the pipe 40 back to the engine.

To get best results, the filter should be washed out each time the car is greased or every one or two thousand miles. When cleaning the filter without removing the cartridge the valves 39 and 41 are shut, and the valve 43 is opened. The plugs 8 and 10 are now removed and sufficient kerosene is poured through the opening provided by the removed plug 8 to wash the filter material and to wash the sediment from the bottom 9. I have found that about two quarts of kerosene is necessary and a funnel is used in order to direct this kerosene through the opening in the cover 6. The plug 8 is now put back in place and the engine 36 is started, and is allowed to run until the oil flowing through the pipe 38, the branch pipe 42, and the pipe 40, will enter the top of the casing 1 and will first flush out the kerosene through the opening in the bottom 9, and then finally the oil itself will start to flow through the opening. When approximately one quart of oil is withdrawn in this manner, the engine is stopped and the plug 10 is reinserted. The valves 39 and 41 are now opened, and the valve 43 is closed. The amount of oil removed from the filter is now replaced by adding the same quantity of new oil to the crank case of the engine.

If desired, after the filter has been used for some time, the entire cartridge can be removed, and a new one substituted for the used one.

In Figures 4 to 7 inclusive I show a modified form of the invention in which the only change is the making of the filter casing 50 out of sheet metal instead of from a casting, and in the placing of the filtering pads directly in the casing 50, and thus doing away with the cartridge. It will also be seen in Figure 4 that the cover 51 is secured to the casing 50 by crimping the edges of the two together as at 52. In this form of the device the bottom 53 is made thicker as at 54 in order to receive a plug 55 corresponding to the plug 10. In like manner the cover 51 is provided with a thicker portion 56 for receiving a plug 57 corresponding to the plug 8.

The lowermost screen in this form of the device corresponds with the screen 13, and is therefore given the same number. The screen 13 rests on the shoulder 2. The screen also carries the oil deflector 15.

Figure 7:
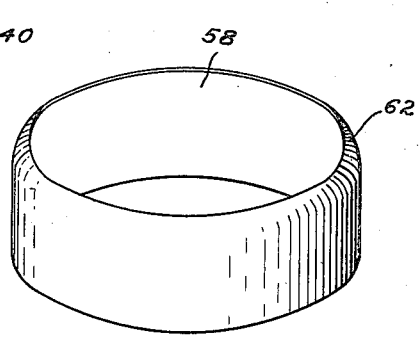
Figure 7 is a perspective view of one of the oil deflecting rings.
Figure 6:
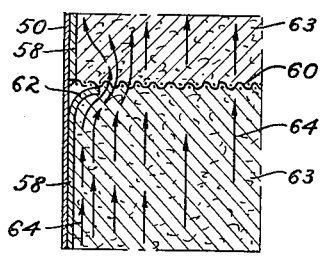
Figure 6 is a detailed section through a part of the modified form.

Deflector rings of the shape shown in Figures 1 and 3, and also shown in perspective in Figure 7 are provided, and the three rings in this form of the device are given the number 58. A filtering pad 59 is placed on the screen 13 and rests on the deflector 15. It will be noted in this form of the device that the screens 60 are mounted on top of the curved upper edges 62 instead of being disposed beneath these edges as shown in the form of the device already described. Filtering pads 63 are mounted on the screens 60.

The large pad 29 is placed on the top screen 60 and this pad is held in place by the rings 30 and 31, and the screen 32.

The operation of this form of the device is identical to that of the first form, and although I have not shown the by-pass 42 in the pipes 38 and 40, it is obvious that such a by-pass is to be used on this form of filter. In order to more clearly show the action of the oil in flowing upwardly past the curved edges 62, I have shown the flow of oil by arrows 64.

I claim:

1. An automobile oil filter comprising a casing having a cylindrical wall and a closed bottom, a portion of the wall extending from the bottom being of a smaller diameter than the remainder of the wall and forming an outwardly extending shoulder at the juncture of the two portions, a screen supported by the shoulder, an oil inlet pipe extending upwardly through the casing bottom and screen and terminating a short distance above the screen, an oil deflector secured to the top of the screen and covering the inlet pipe, an oil deflecting ring abutting the inner surface of the wall and resting on the screen, said deflecting ring having an inwardly curved upper edge for directing the oil flow toward the casing center, filtering material placed in the ring, a screen overlying the ring, a second oil deflecting ring and filtering material placed on the last named screen, and an oil outlet extending from the casing top.

2. An automobile oil filter comprising a casing having an inlet pipe in its bottom and an outlet pipe at its top, said casing having two shoulders formed therein, a removable cartridge having a shoulder, a gasket placed on each casing shoulder and supporting the cartridge shoulder and the bottom of the cartridge, a screen extending across the bottom of the cartridge, a deflector carried by the screen and being disposed over the inlet pipe, a plurality of rings disposed one above the other in the cartridge, said rings having inwardly curved upper edges, filtering material surrounded by the rings, screens separating the filtering material of each ring from adjacent filtering material, a filtering pad extending across the uppermost ring and having its marginal edge extending over the cartridge shoulder, a cup-shaped member having a screened bottom for bearing against the pad and providing an oil receiving compartment, and a casing cover secured to the casing and holding the cartridge in position.

3. In a filter, a casing having a shoulder, a filtering pad having its edge extending over the shoulder, a ring pressed into the top of the pad for forcing the pad edge against the shoulder and against the casing wall disposed above the shoulder so that the bottom and the side of the ring are enclosed by the pad, and a cup-shaped member having a screened bottom, said member being disposed within the ring and forming an oil compartment in the top of the casing.

4. A filter comprising a cylindrical casing formed from sheet metal and having a shoulder formed therein, the portion of the cylinder above the shoulder being larger in diameter than the portion below the shoulder, an inlet pipe extending into the bottom of the casing, a screen supported by the shoulder and being disposed a slight distance below the top of the inlet pipe, an oil deflector carried by the top of the screen and being disposed above the inlet pipe, filtering material covering the screen and deflector, additional filtering means disposed above the filtering material, a cover crimped to the top of the casing, and an outlet pipe leading from the casing.

5. A removable oil filter cartridge comprising a casing having a screened bottom and a shoulder in its wall, oil deflecting rings placed in the casing and having inwardly curved oil deflecting upper edges, screens extending across the tops of the rings, filtering material disposed in the rings, a filtering pad resting on the shoulder, a ring for clamping the edge of the pad against the casing wall, a cup-shaped member disposed in the last named ring and having a screened bottom and a cover for the casing and bearing against the last-named ring and cup-shaped member, said cover having an opening therein.

CHARLES A. COMPTON.